United States Patent
Heine et al.

(10) Patent No.: US 9,665,079 B2
(45) Date of Patent: May 30, 2017

(54) CONTROLLER HAVING A VERSION CONTROL SYSTEM

(71) Applicant: Honeywell International Inc., Morristown, NJ (US)

(72) Inventors: Daniel Heine, Bellevue, WA (US); Cuong Huynh, Renton, WA (US); Stuart Donaldson, Bothell, WA (US)

(73) Assignee: Honeywell International Inc., Morris Plains, NJ (US)

( * ) Notice: Subject to any disclaimer, the term of this patent is extended or adjusted under 35 U.S.C. 154(b) by 494 days.

(21) Appl. No.: 14/226,594

(22) Filed: Mar. 26, 2014

(65) Prior Publication Data

US 2015/0277402 A1 Oct. 1, 2015

(51) Int. Cl.
*G01M 1/38* (2006.01)
*G05B 15/02* (2006.01)
*G06F 9/44* (2006.01)
*G06F 9/445* (2006.01)

(52) U.S. Cl.
CPC ............ *G05B 15/02* (2013.01); *G06F 8/71* (2013.01); *G06F 8/65* (2013.01)

(58) Field of Classification Search
None
See application file for complete search history.

(56) References Cited

U.S. PATENT DOCUMENTS

| 7,131,112 | B1* | 10/2006 | Bartz .................. G06F 8/71 |
| | | | 707/999.201 |
| 7,885,961 | B2 | 2/2011 | Horowitz et al. |
| 7,917,232 | B2 | 3/2011 | McCoy et al. |
| 7,945,615 | B1* | 5/2011 | Shetty ............. G06F 17/30371 |
| | | | 709/203 |
| 8,191,051 | B2 | 5/2012 | Ahmed et al. |
| 8,495,611 | B2* | 7/2013 | McCarthy .......... H04L 41/0806 |
| | | | 709/203 |
| 2003/0005426 | A1* | 1/2003 | Scholtens .............. G06F 8/67 |
| | | | 717/169 |
| 2003/0177408 | A1* | 9/2003 | Fields ................. G06Q 10/10 |
| | | | 713/400 |

(Continued)

OTHER PUBLICATIONS

Siemens, "Insight-Advanced Workstation," Siemens Industry, Inc., 5 pages, Jun. 2012. Document No. 149-333P25.

(Continued)

*Primary Examiner* — Wissam Rashid

(74) *Attorney, Agent, or Firm* — Seager, Tufte & Wickhem, LLP

(57) ABSTRACT

A system and approach for managing configuration versions for controllers. The system and approach may incorporate a building controller, a version control system, and a computer connected to the controller and version control system. The version control system may have the controller configured to a latest version of changes as incorporated by a current configuration without losing one or more previous configurations. The one or more previous configurations may be recoverable by the version control system. The one or more previous configurations and the current configuration may be held by one or more repositories. The one or more repositories may be hosted in the computer, a remote computer, or a server.

19 Claims, 7 Drawing Sheets

(56) References Cited

U.S. PATENT DOCUMENTS

| | | | |
|---|---|---|---|
| 2005/0120242 A1* | 6/2005 | Mayer | G06F 21/56 726/4 |
| 2008/0168306 A1* | 7/2008 | Clement | G06F 8/71 714/15 |
| 2008/0196023 A1* | 8/2008 | Park | F24F 11/0086 717/173 |
| 2008/0243565 A1 | 10/2008 | Gregory | |
| 2010/0228373 A1 | 9/2010 | Lucas et al. | |
| 2011/0047583 A1* | 2/2011 | Howard | H04W 8/30 725/109 |
| 2011/0153791 A1 | 6/2011 | Jones et al. | |

OTHER PUBLICATIONS

Trane, "Tracer Summit(R) Building Automation System," Ingersoll Rand, 4 pages, Mar. 1, 2010. BAS-SLB020-EN.

WebMethods, "webMethods Version Control System Integration; Developer's Guide," webMethods, Inc. Version 6.5, Service Pack 2, 90 pages, Jan. 13, 2006.

* cited by examiner

CONTROLLER HAVING A VERSION CONTROL SYSTEM

BACKGROUND

The present disclosure pertains to retention of items such as documents, software, configurations, data, and the like. Also, the disclosure pertains to retrieval of such items.

SUMMARY

The disclosure reveals a system and approach for managing configuration versions for controllers. The system and approach may incorporate a building controller, a version control system, and a computer connected to the controller and version control system. The version control system may have the controller configured to a latest version of changes as incorporated by a current configuration without losing one or more previous configurations. The one or more previous configurations may be recoverable by the version control system. The one or more previous configurations and the current configuration may be held by one or more repositories. The one or more repositories may be hosted in the computer, a remote computer, or a server.

DESCRIPTION

Figure 1:
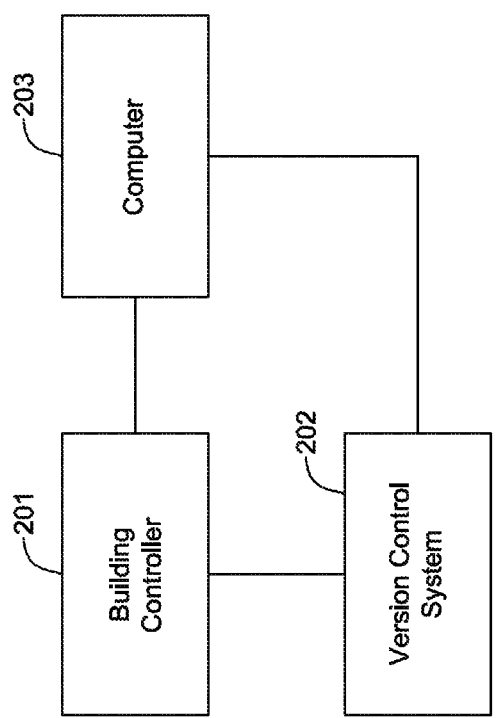
FIG. 1 is a diagram of an example layout of a controller and a version control system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Keeping track of the "master copy" of the building controller configuration file(s) may be an issue when multiple technicians make changes from multiple laptop computers virtually all affecting the same building controller.

When building controllers are reconfigured in the field during a technician's maintenance visit, the configuration changes may sometimes get overwritten by unrelated changes made back in the office when they are installed during the next maintenance visit. Additionally, changes that have been made in error are sometimes difficult to "undo" because of the lack of versioning information.

In addition, backup and restore of multiple checkpoints may be problematic. Being able to recover a previous configuration at any given point in time may allow an operator to troubleshoot issues by reverting configuration changes back to a known-good working version.

By integrating a version control system ("VCS" such as Subversion) or a distributed version control system ("DVCS" such as Git or Mercurial) into the configuration toolset used by the dealer as well as into the building controller itself, the configuration may be updated by multiple technicians on multiple laptops and still maintain accurate change history, avoid overwriting changes previously made, and provide the ability to "revert" or undo unwanted or temporary configuration changes.

The present approach may integrate a VCS/DVCS into the toolset and into a control module (building controller) as well as into the computers (PCs) and servers that are also configured with the toolset.

Each controller may be configured offline (for instance, in a local dealer's office) and the changes might be either transmitted to the controller via a IP-based protocol or "sneaker-netted" out to the site using USB (universal serial bus) drives, laptops, and so on, for direct synchronization, for example, when internet or VPN (virtual private network) access is not available. "Sneaker-net" may be an informal term describing the transfer of electronic information, especially computer files, by physically moving removable media such as magnetic tape, floppy disks, compact discs, USB flash drives (thumb drives, USB stick), or external hard drives from one computer to another, often in lieu of transferring the information over a computer network.

The repositories for configurations of building controllers or configuration repositories may be hosted on virtually any laptop, computer or the like, as well as on a dedicated site server (e.g., "Fog Server") that allows virtually all building controllers on that site to be automatically or manually synchronized to the latest configuration without losing locally generated configuration changes that may have been made by the building operators or during previous maintenance visits.

A VCS (e.g., Git) may be integrated into a file system of the building controller and establish connectivity to as many remote repositories as desired.

Each repository instance may be independently updated/edited and then merged, with conflict detection and resolution, into the final configuration in the building controller.

LIB may represent an engineering library (which may contain building controller applications, displays, and documentation). VAULT may represent a project vault (which may contain individual building controller configuration files). SWUP may represent software update service (which may contain Alerton™ software that can be downloaded into building controllers). Global Controller (GC) applications may be noted.

The present system may take a BACtalk system and add a further line of supervisors, tools, cloud/fog services, global controller-class hardware and applications, wall displays, wireless sensors and concentrators, and protocol integration capability using Niagara.

The present system may replace the certain BACtalk ABS components (EBT, WEBtalk, and BACtalk Builder) with a line of supervisors, tools and products that can run over the web using thin-client technology as well as retaining the richness of thick-client technology for some specialized, high-performance tasks.

A supervisor layer may run in the cloud, in a dedicated on-site or on shared servers, or embedded in global-controller-class hardware for small or distributed jobs. The tools may also run in the cloud, in dedicated on-site or shared servers, or on the embedded global-controller-class hardware. Many tools may run as thin-client applications on laptop machines, some (e.g., Visual Logic) can be installed as thick-client applications, and some can even support tablets and other mobile devices.

The services layer may provide software as a service feature with an intent of centralizing certain services such as the Alerton application share place, backup and archival services, engineering repositories for job design and configuration data as well as Alerton standard applications, and software update services among others.

The system may provide for both automatic and manual data synchronization between the cloud services, fog services, ABS IDE, and on-site data. This may be envisioned to be handled using a combination of epoch-driven tags (e.g., global time stamps or version numbers) as well as synchronization policy selections (e.g., "last write wins") and manual overrides (e.g., "replace current configuration with a configuration from an Engineering Repository").

There may be history and configuration archiving that support automatic data synchronization and "time machine"-like capability using version numbers or global time stamps.

An epoch-based approach may be taken for persistent storage to mitigate the "last write wins" issue that can cause edits to be lost without the user becoming aware of it until some undefined time later.

When a user or system changes a configuration setting, the original epoch of the parameter to be changed may be presented to a persistent storage layer as a means of detecting whether or not the value has been changed by someone else in the mean-time. This may be in contrast to other common approaches (which we have not chosen) that include the original value of a field or record as part of the commit process. These types of techniques may result in large performance and bandwidth penalties. Since epoch-based persistence management may have been selected as a key part of the web app design paradigm, it may be used in the persistence layer as well.

A primary communication protocol between the present aware devices may be the Niagara network (Fox) protocol.

An ABS (Alerton building suite) may be part of the BACtalk architecture and consist of the supervisors, IDEs, global controllers, and services. Unitary controllers, sensors, displays, and wireless subsystems are not necessarily contained in the Alerton building suite but may rather be interfacing systems to the Alerton building suite.

Figure 3:
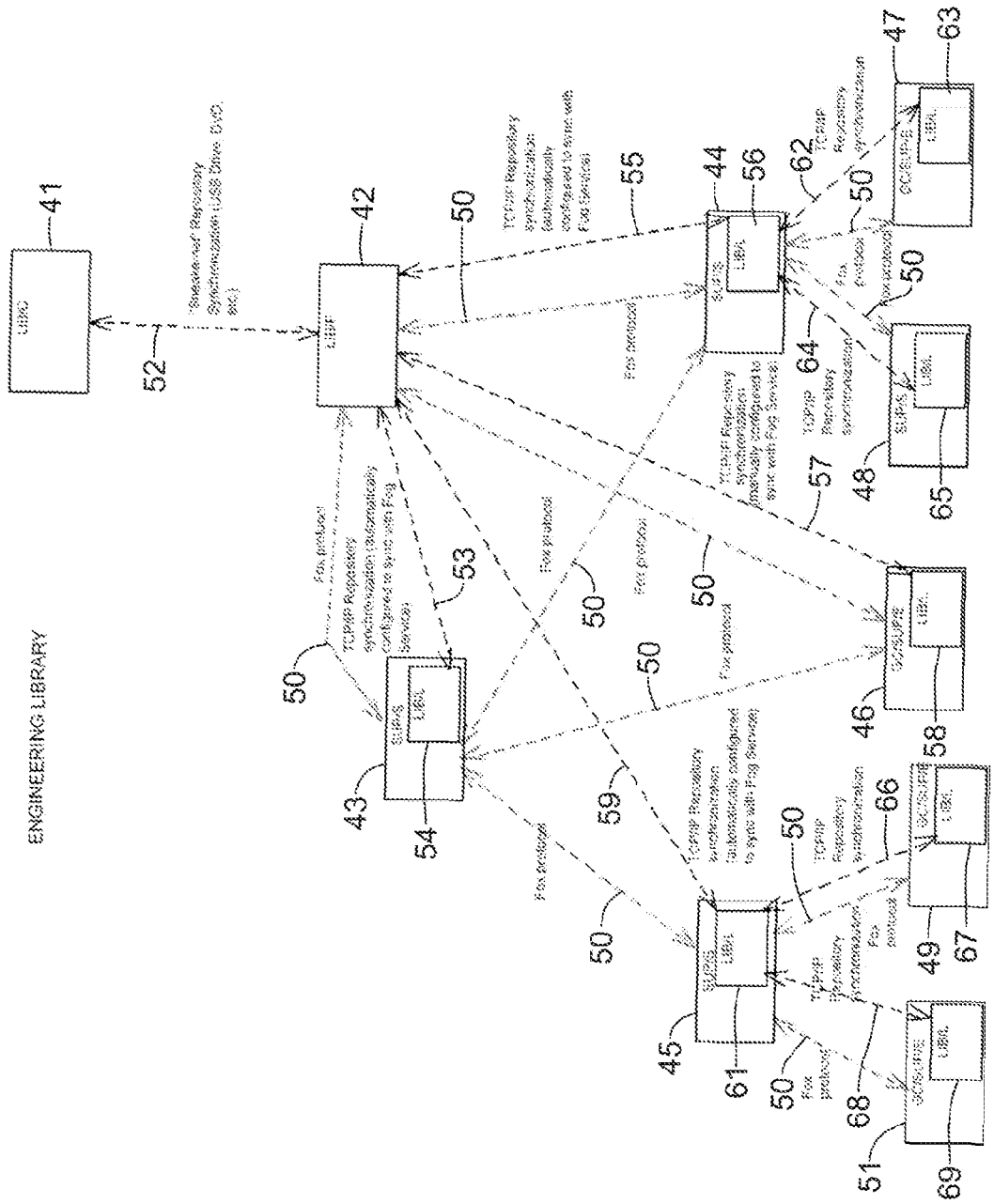
FIG. 3 is a diagram of an engineering library architecture approach
Figure 4:
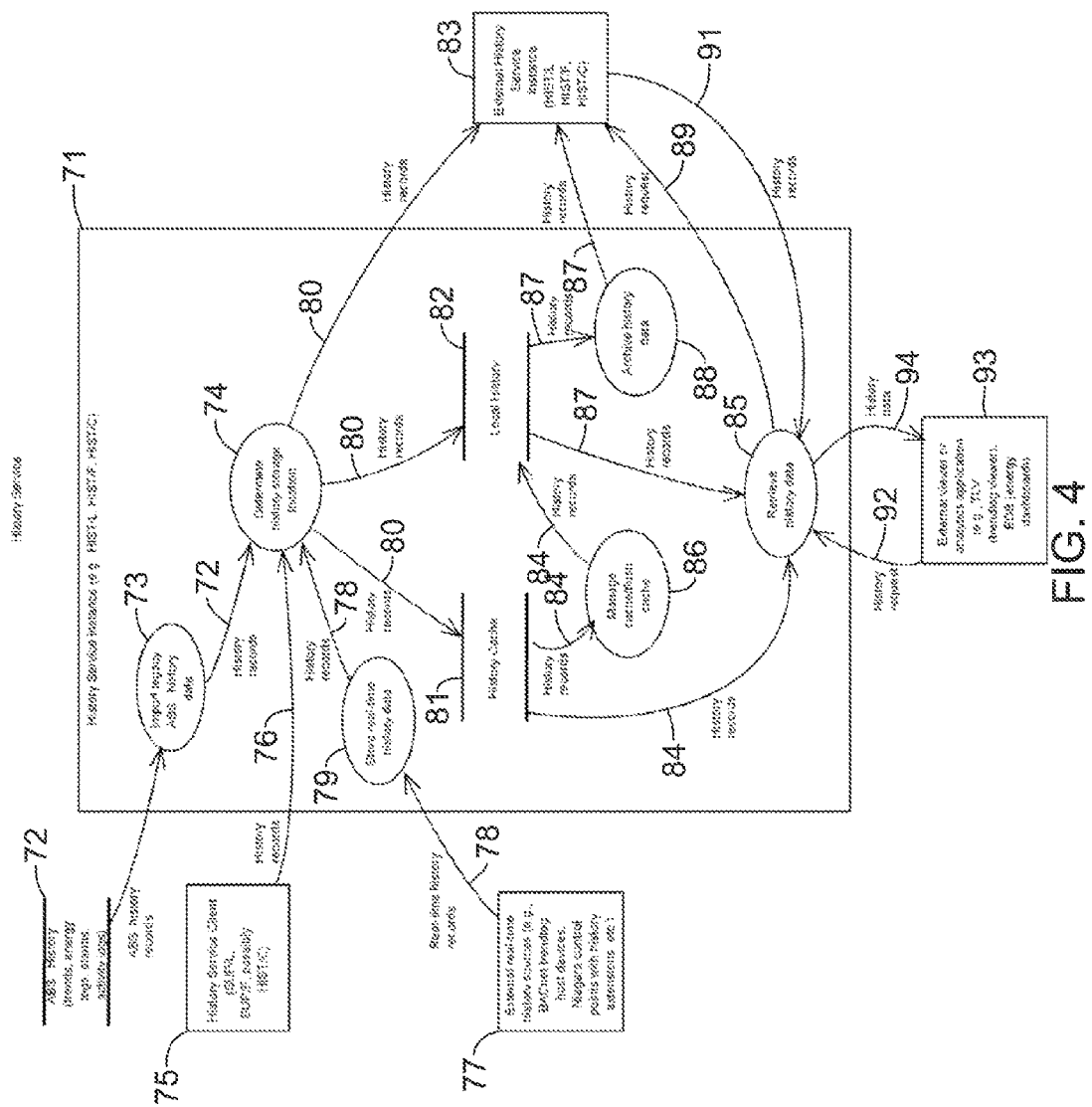
FIG. 4 is a diagram of a history service data flow.
Figure 5:
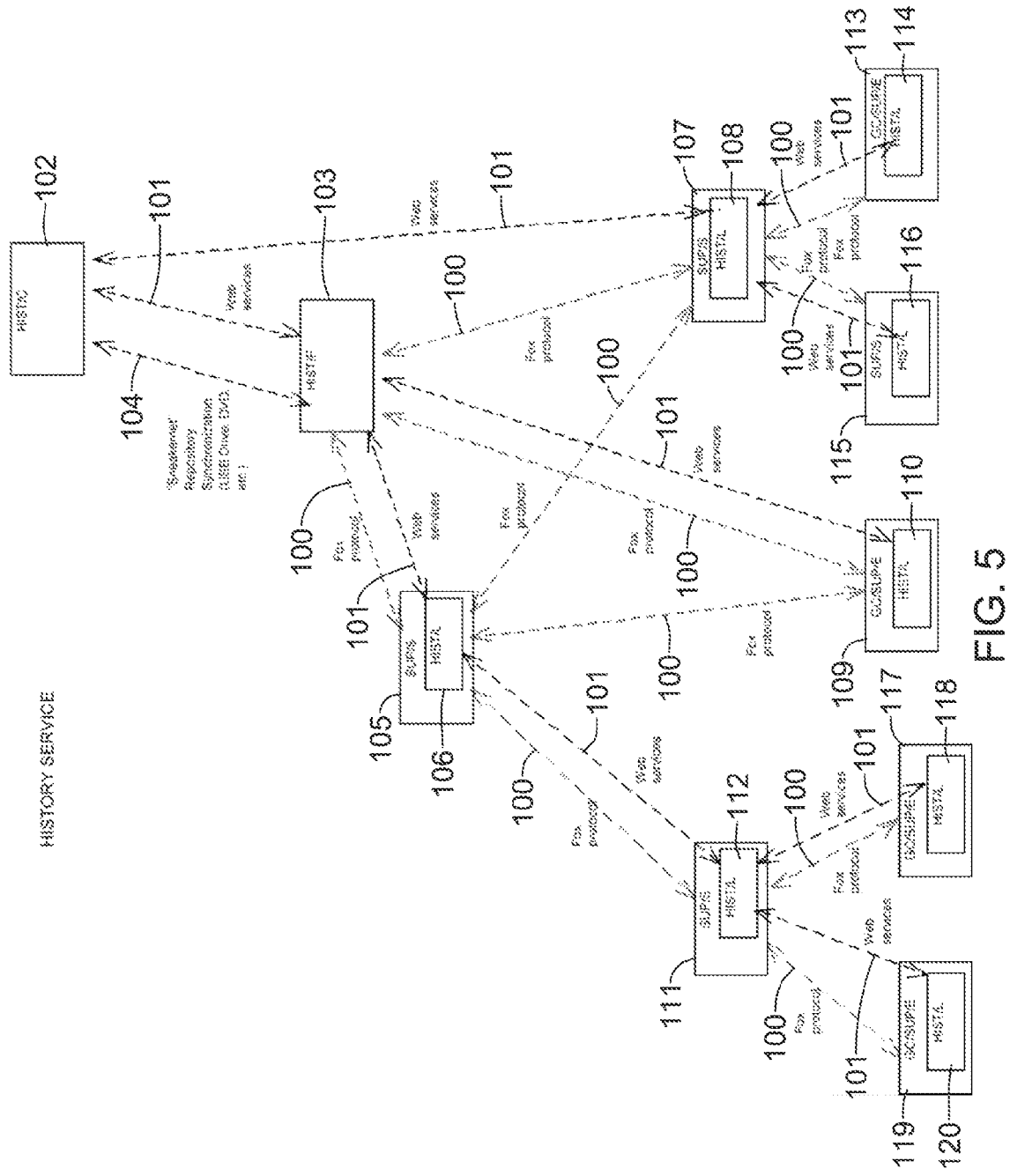
FIG. 5 is a diagram of a history service.
Figure 6:
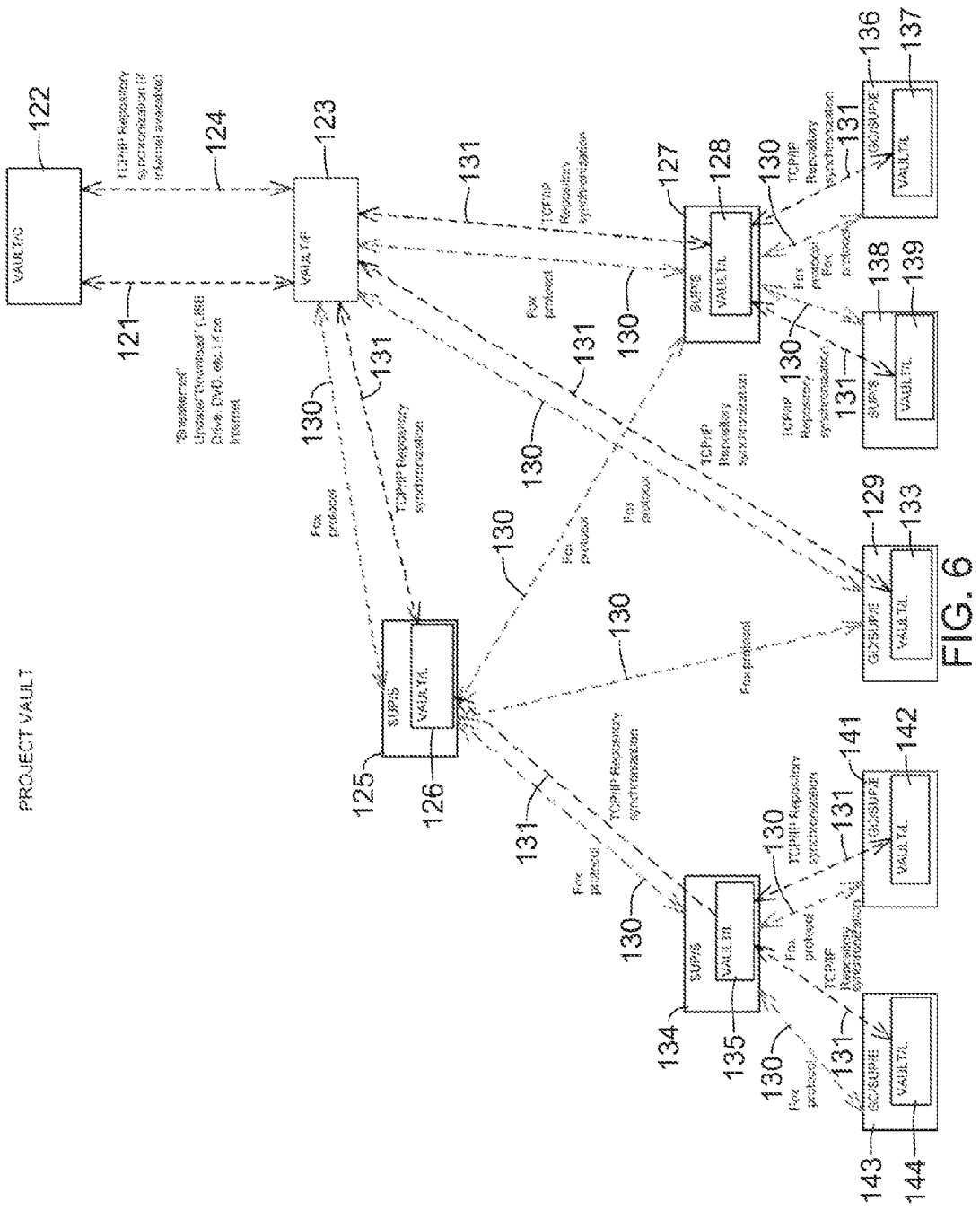
FIG. 6 is a diagram of a project vault.

FIG. 3 is a diagram of an engineering library architecture approach. FIG. 4 is a diagram of a history service data flow. FIG. 5 is a diagram of a history service. FIG. 6 is a diagram of a project vault.

A history service (HIST) may be used to store history data, archive it, and retrieve it for use by history viewers and other analytics applications. The history service may have a local cache that is used for saving history records coming in from the various devices. The devices themselves may use their own approaches (e.g., BACnet trend logs, Niagara histories, and so on) for collecting history records prior to sending them to the history service via Web services.

In the case of a legacy, a BACtalk job that has been upgraded, the history service in an ABS supervisor (SUP) may also participate in providing a rapid upgrade experience for the user.

In upgrading the ABS, a user experience may have been previously degraded by a long conversion time required for a large amount of history data (potentially as large as 20 GB of access databases) migrating to a new database schema used by ABS. For the ABS upgrade, this experience may be improved by decoupling the upgrade process for configuration data and history data.

Configuration data may tend to be relatively small (perhaps 10,000-20,000 devices maximum) compared to history data, which, as stated, could run to 20 GB or more of access or SQL server database records.

In order to perform the upgrade of ABS history data concurrently with operating the facility using the later ABS (in order to avoid downtime while performing the upgrade), the history service may import the previous ABS data while continuing to store new history records. Since Niagara cannot necessarily support storing history records out of order (that is, it cannot allow older records to be added once newer records are already in the history file), the history service may have designed that so both meet this constraint and allow import of older records. It may do this by handling the history record upgrade from the legacy data format(s) in the background while the later ABS SUP job is running, the facility following a very quick upgrade of just the job configuration data from the one ABS to the later ABS.

A project vault (VAULT) service may be responsible for providing an API for applications to call and/or register with for storing and retrieving configuration data, providing the ability to perform peer-to-peer synchronization between IDE laptop applications, fog server applications, cloud applications, embedded controller applications, and server-based applications, providing notifications to applications when synchronization events occur such as new configuration data is available (e.g., finished synchronizing an application's data with another instance of the project vault (VAULT)), synchronization progress (e.g., an application may command a synchronization of a particular set of data for which that application is responsible and that application has asked for progress indication callbacks every, for example, 10 seconds), and a synchronization conflict has been detected and the application should provide the solution to the conflict prior to continuing with the synchronization.

An overall approach for project (job) persistence storage may be the use of a distributed version control system (a commercially available Git has been selected) to synchronize file-based configuration definitions as well as the ability to synchronize relational databases.

The version-controlled files may contain the configuration content that the application uses to initialize or update its view of the job. In some cases, this may be a file that is used in real time by the application such as a SQLite*.db file representing a set of objects stored in a controller. In other cases, this may be an Excel spreadsheet used to initialize the list of devices for which a device server is responsible. Or the file may be a *.px display file or an XML file used to define the capabilities of an Alerton VLCA-1688 controller.

File-based distributed version control synchronization may be further noted. A basic unit of synchronization may be the individual file using directories under distributed version control, one per device and/or service, which contain the file(s) and/or sub-directories to be synchronized. Each unique instance of a device (e.g., server running SUP/S) and/or application (e.g., LIB engineering library service running in the cloud) may have one or more directories (projects) that represent Git projects. The Git projects may be "checked out" into a flat directory structure under the station directory, one per device and/or application instance. The VAULT service may be responsible for maintaining and synchronizing the job-specific directories (i.e., those that are under configured based on a particular job), while the LIB service may be responsible for maintaining and synchronizing the directories that are controlled at either the Alerton-level (e.g., "Alerton Standard", system-level help files, just-in-time tutorials, and so on) or are dealer shared libraries (e.g., an "ATS Standard", dealer-developed help topics, videos, and so forth).

For example, there may be a directory layout of a supervisor running VAULT, HIST and LIB and that has two device servers (ACMs) plus its own configuration to keep track of. The only configuration stored in the HIST_SVC configuration directory may be used to configure the HIST service itself—the actual data managed by HIST may be stored in other locations that are defined by files in the HIST configuration directory.

Database synchronization may be noted. It is not necessarily currently baselined that databases will contain the master configuration data. Rather, the files may contain this data and the database may be built "on the fly" to represent the controlled configuration.

For example, the an ITTIAS embeddable database may be looked at due to its replication and synchronization capabilities, its compatibility with flash memory storage, its integrity and certification for use in financial transactions, and its ability to interoperate with SQL Server.

However, if a database is used as the principal source for some particular piece of configuration data, it may be under the control of VAULT for synchronization.

Databases may definitely be used for other purposes in a system. For example, databases may be used as caches for fast lookup and indexing for a logical model, or for alarm or other history data. The databases will not necessarily be under the control of the VAULT service but rather may be controlled, created, deleted, and so on by their respective applications using the database service layer elsewhere in a framework.

Vault instance synchronization may be noted. The various repositories (vaults or instances of the VAULT service) may synchronize with each other as configured in their respective configuration files and as discovered by the actions, topics, and properties shared between instances of VAULT objects as shown in the dashed lines labeled "Fox protocol". The actual data synchronization paths may use TCP/IP and be shown in the dashed lines labeled "TCP/IP repository synchronization".

FIG. 6 is a diagram of project vault architecture. Project configuration data persistence architecture may be noted. The project vault service may rely on several approaches and architectural concepts for storing configuration data and providing the ability to perform peer-to-peer synchronization.

Figure 7:
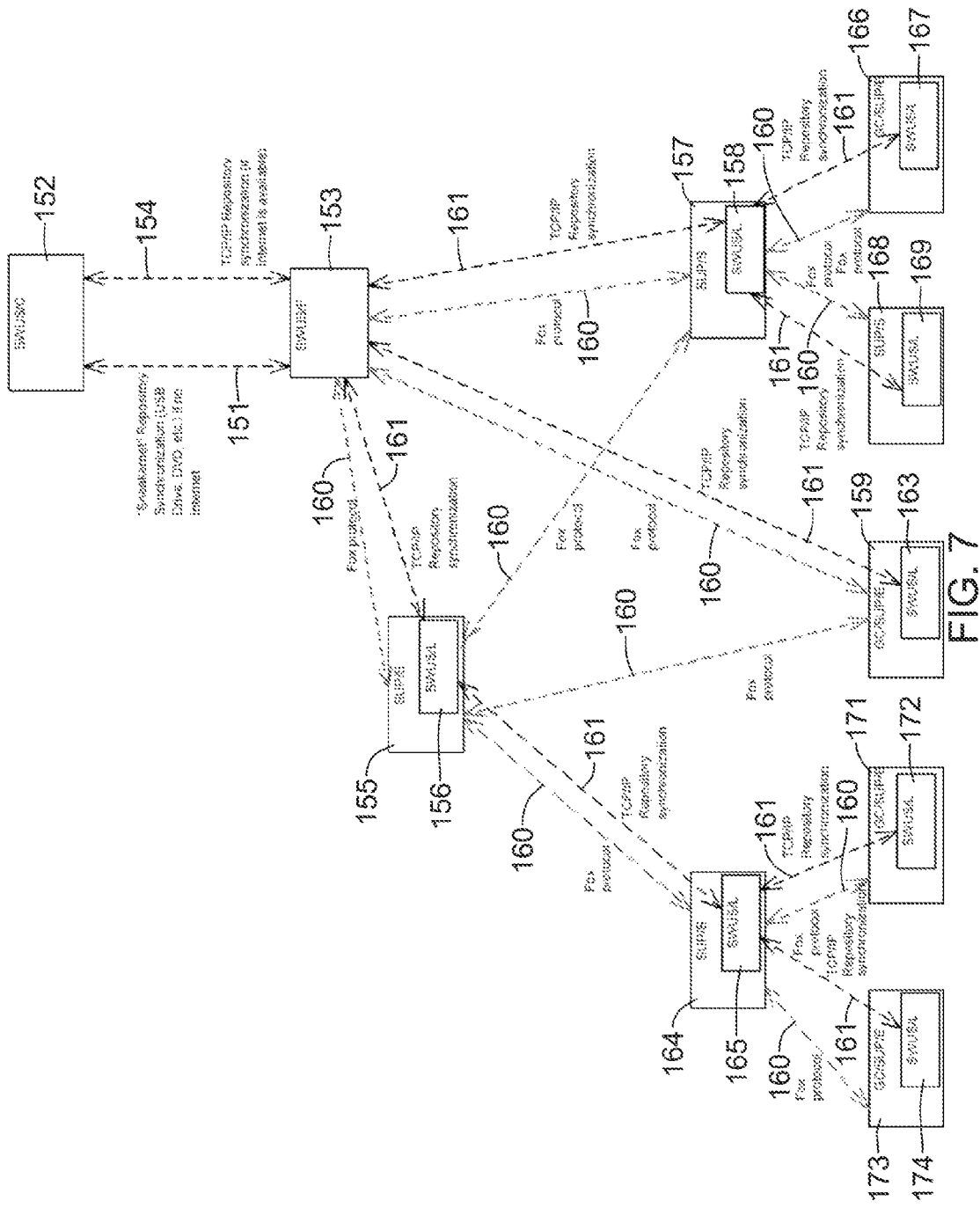
FIG. 7 is a diagram of a software update service architecture.

The software update service (SWUS) may be noted. FIG. 7 is a diagram of a software update service architecture. An Alerton store delivery service may provide interfaces to the BACtalk products similar to those provided by a Niagara™ central. In particular, a web service may be provided that takes a host ID and a license key as arguments and, absent any error conditions, returns a previously-purchased license—corresponding to the license key—bound to the host ID. The license need not necessarily have been previously bound to that host ID, but it may be an error if that license has already been bound to some other host ID.

Additional information may be available to the product for display in an RIA application via other web services. The additional information may incorporate a list of software applications that use specific license features so that the user can be prompted to download software applications for which he has obtained a license but which are not yet necessarily available on the host represented by a particular host ID.

The software may then be downloaded by the user from the software update service (not shown here) in a seamless operation. The user need not necessarily be aware that the RIA app has downloaded the software from another web service. The Alerton store delivery service may or may not end up being configurable to provide a proxy service for the software update service. This may depend on cross-site authorization decisions that could occur later in the design phase.

Repository synchronization participants may be automatically configured, but the automatic settings could be changed manually by the dealer engineer. By default, a SUP may synchronize with its parent SUP's local engineering library (LIB/L). If a fog service is present (LIB/F), it may publish its presence to the SUP/S supervisors. Virtually all SUP/S supervisors may automatically sync with the fog service. If a fog service is not present (no LIB/F on the Fox network), each SUP/S may synchronize with its parent server (if any).

Embedded supervisors (SUP/E) may automatically sync with their parent SUP/S or SUP/C (but not necessarily with a SUP/E due to capacity limitations). They supervisors may be configured manually to sync with a fog service (LIB/F), if present.

The LIB may check license features to determine how many clients (that is, other LIB instances) are allowed to synchronize with it. By default, each LIB/L may synchronize with its immediately subordinate servers (e.g., its SUP/E subordinates).

Relative to FIG. 5, history service participants may be automatically configured, but the automatic settings can be changed manually by the dealer engineer.

Virtually all SUP functions and applications (e.g., trend viewer, energy log viewer, energy dashboard, user activity log viewer, and so forth) may access history data via the local HIST service (HIST/L). The HIST/L service may be configured to archive data to one of the following items. Another HIST/L service (for example, a SUP/E can archive history data to the SUP/S's HIST/L service). As to the fog server (HIST/F), for example, virtually all supervisors may be configured to archive to a fog server's HIST/F service. As to a cloud server, for example, supervisors (or even fog servers) may be configured to archive their histories to a cloud server (HIST/C).

With FIG. 6 in mind, repository synchronization participants may be automatically configured, but the automatic settings can be changed manually by the dealer engineer. By default, a SUP may synchronize with its parent SUP's local project vault (VAULT/L). If a fog service is present (VAULT/F), it may publish its presence to the SUP/S supervisors. Virtually all SUP/S supervisors may automatically sync with the fog service. If a fog service is not present (i.e., no VAULT/F on the Fox network), each SUP/S may synchronize with its parent server (if any).

Embedded supervisors (SUP/E) may automatically sync with their parent SUP/S or SUP/C (but not necessarily with a SUP/E due to capacity limitations). The supervisors may be configured manually to sync with a fog service (VAULT/F), if present.

The VAULT may check license features to determine how many clients (that is, other VAULT instances) are allowed to synchronize with it. By default, each VAULT/L is will synchronize with its immediately subordinate servers (e.g., its SUP/E subordinates).

The VAULT/F (and VAULT/C) may contain the entire job. Each VAULT/L may contain only the subset of the job required to serve itself and any subordinate VAULT/L services that depend on it.

With FIG. 7 in mind, software update service participants may be automatically configured, but the automatic settings can be changed manually by the dealer engineer.

By default, a SUP will download from its parent SUP's local software update service (SWUS/L). If a fog service is present (SWUS/F), it may publish its presence to the SUP supervisors. Virtually all SUP supervisors may, by default, use the fog service as their download source.

FIG. 1 is a diagram of an example layout of a controller and a version control system. A building controller 201 may be connected to a version control system 202. An item 203 such as a computer, personal computer (PC), server or other appropriate device, may be connected to building controller 201 and version control system 202.

Figure 2:
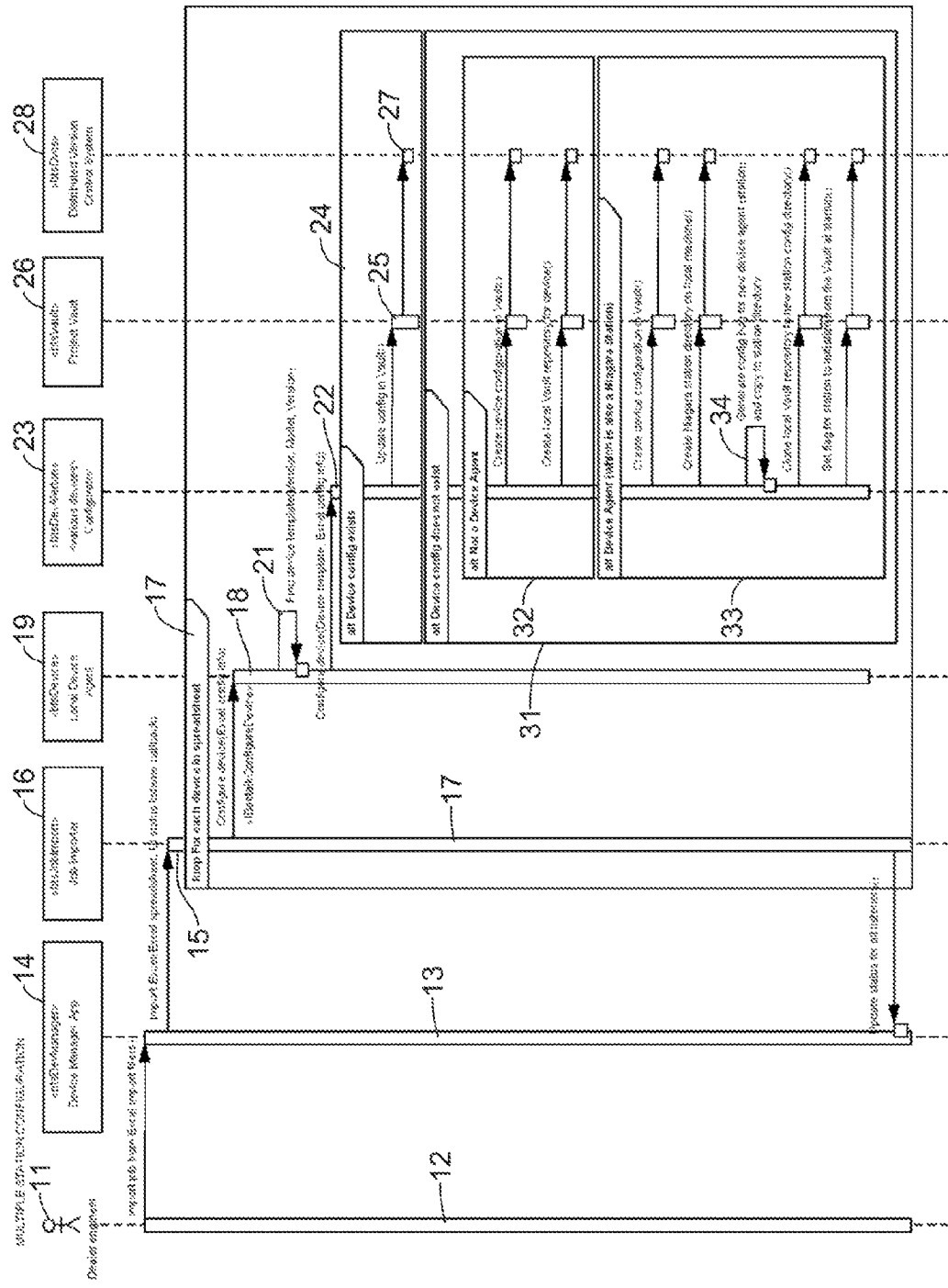
FIG. 2 is a diagram of a multiple station configuration.

FIG. 2 is a diagram of a multiple station configuration. In view of the diagram, a dealer engineer 11 may import a job from Excel™ import file(s) from place 12 to a place 13 of a device manager 14. The Excel spreadsheet, with a user interface callback, may be imported from place 13 to a place 15 of a job importer 16. There may be a loop 17 for each device in the spreadsheet. From place 17 to a place 18 of a local device agent 19, a device of the loop may be configured.

From place 17 to place 18 may be an update status indicated for all listeners. At place 18, a template (vendor, model, or version) may be found at path 21. From place 18 to a place 22 of a configurator 23, the device may be configured in view of the device template and Excel configuration information. In an area 24, a device configuration may exist. From place 22 to a place 25 of a project vault 26, there may be an update configuration in the vault. The device configuration may go from place 25 to a place 27 of a distributed version control system 28.

An area 31 may be where a device configuration does not exist. In a sub-area 32 of area 31 may not be a device agent. In a sub-area 33 of area 31, there may be a device agent (which may also be a Niagara station).

From place 22 to place 25 in sub-area 32, for where there is not a device agent, a device configuration may be created in the vault and a local vault repository may be created for the device. The device configuration and the device may go from place 25 to place 27 of the distributed version control system.

From place 22 to place 25 in a sub-area 33, for where there is a device agent, a device configuration may be created in the vault, and a local vault repository for the device may be created. The device configuration and repository may go from place 25 to place 27.

A configuration bog for a new device agent (station), at a loop 34 of place 22, may be generated and copied to a station directory.

From place 22 to place 25, a local vault repository may be cloned to a new station configuration directory. The cloned local vault repository may go from place 25 of project vault 26 to place 27 of distributed version control system 28. From place 22 to place 25, a flag may be set for a station to initialize from the vault at startup, which may go on to place 27 of distributed version control system 28.

FIG. 3 is a diagram of an engineering library approach. Between LIB/C 41 and LIB/F 42 may be a connection 50 for sneaker-net repository synchronization. Between CAV-LIB/F 42 and SUP/S 43, SUP/S 44, SUP/S 45 and GC/SUP/E 46, may be a connection 50 utilizing a Fox protocol.

Between SUP/S 44 and GC/SUP/E 47 and GC/SUP/E 48 may be a connection 50 utilizing a Fox protocol. Between SUP/S 45 and GC/SUP/E 49 and GC/SUP/E 51 may be a connection 50 utilizing a Fox protocol. Another protocol may be utilized in lieu of the Fox protocol in the engineering library approach.

A sneaker net repository synchronization (via a USB drive, DVD, and the like) connection 52 may be provided between LIB/C 41 and LIB/F 41. A TCP/IP repository synchronization (automatically configured to sync with a fog service) connection 53 may occur between LIB/F 42 and LIB/L 54. A TCP/IP repository synchronization (automatically configured to sync with fog service) connection 55 may occur between LIB/F 42 and LIB/L 56. A TCP/IP repository synchronization (manually configured to sync with fog service) connection 57 may occur between LIB/F 42 and LIB/L 58. A TCP/IP repository synchronization (automatically configured to sync with fog service) connection 59 may occur between LIB/F 42 and LIB/L 61. A TCP/IP repository synchronization connection 62 may occur between LIB/L 56 and LIB/L 63. A TCP/IP repository synchronization connection 64 may occur between LIB/L 56 and LIB/L 65. A TCP/IP repository synchronization connection 66 may occur between LIB/L 61 and LIB/L 67. A TCP/IP repository synchronization connection 68 may occur between LIB/L 61 and LIB/L 69.

FIG. 4 is a diagram relating to an instance 71 of history service. ABS history record 72 (e.g., trends, energy logs, alarms, activity logs, and so on) may be provided to a symbol 73 where legacy ABS history data are imported. History records 72 may go to symbol 74 where a determiner of history storage location is situated.

A history service client 75 (SUP/L, SUP/F, and possibly HIST/C) may provide history records 76 to a determiner of a history storage location. External real-time history sources 77 (e.g., BACnet, trendlog, host, devices, Niagara control points with history extensions, and so forth) may provide real-time history records 78 symbol 79 for storing real-time history data. From symbol 79, history records may go to determiner 74 of history storage location. History records 80 may go from determiner 74 to a history cache 81, local history 82 and external history service instance 83 (HIST/L, HIST/F, HIST/C). History records 84 may go from history cache 81 to a symbol 85 to retrieve history data and to a symbol 86 to manage cache/flush cache. History records 84 may go from manage cache/flush cache to local history 82. History records 87 may go from local history 82 to symbol 85 to retrieve history data 85 and a symbol 88 to archive history data. History records 87 may go from symbol 88 to external history service instance 83. A history request 89 may go from symbol 85 to external history service instance 83. History records 81 may go from history service instance 83 to symbol 85 to retrieve history data. A history request 92 may go from an external viewer 93 or analytics application (e.g., TLV (trending viewer); EDB (energy dashboard)) to symbol 85 to retrieve history data. History data 94 may go from symbol 85 to external view or analytics application 93.

FIG. 5 is a diagram of a history service approach. A "sneaker net" repository synchronization (USD drive, DVD, or the like) connection 104 may be between HIST/C 102 and HIST/F 103. A web services connection 101 may be between HIST/C 102 and HIST/F 103. Fox protocol or other protocol connection 100 may be between HIST/F 103 and SUP/S 105. Web services connection 101 may be between HIST/F 103 and HIST/L 106. Fox protocol or other protocol connection 100 may be between HIST/F 103 and SUP/S 107. Web services connection 101 may be between HIST/C 102 and HIST/L 108. Fox protocol or other protocol connection 100 may be between SUP/S 105 and SUP/S 107. Fox protocol or other protocol connection 100 may be between HIST/F 103 and GC/SUP/E 109. Web services connection 101 may be between HIST/F 103 and GC/SUP/E 110. Fox or other protocol connection 100 may be between SUP/S 105 and GC/SUP/E 109. Fox or other protocol connection 100 may be between SUP/S 105 and SUP/S 111. Web services connection 101 may be between HIST/L 106 and HIST/L 112. Fox or other protocol connection 100 may be between SUP/S 107 and GC/SUP/E 113. Web services connection 101 may be between HIST/L 108 and HIST/L 114. Fox or other protocol connection 100 may be between SUP/S 107 and SUP/S 115. Web services connection 101 may be between HIST/L 108 and HIST/L 116. Fox or other protocol connection 100 may be between SUP/S 111 and GC/SUP/E 117. Web services connection 101 may be between HIST/L 112 and HIST/L 118. Fox or other protocol connection 100 may be between SUP/S 111 and GC/SUP/E 119. Web services connection 101 may be between HIST/L 112 and HIST/L 120.

FIG. 6 is a diagram of a project vault approach. A sneaker-net update/download connection 121 may be between VAULT/C 122 and VAULT/F 123. A TCP/IP repository synchronization connection 124 (if internet is available) may be between VAULT/C 122 and VAULT/F 123. A Fox or other protocol connection 130 may be between VAULT/F 123 and SUP/S 125. A TCP/P repository synchronization connection 131 may be between VAULT/F 123 and VAULT/L 126. Fox or other protocol connection 130 may be between VAULT/F 123 and SUP/S 127. TCP/IP repository synchronization connection 131 may be between VAULT/F 123 and VAULT/L 128. Fox or other protocol connection 130 may be between VAULT/F 123 and GC/SUP/E 129. TCP/IP repository synchronization connection 131 may be between VAULT/F 123 and VAULT/L 133. Fox or other protocol connection 130 may be between SUP/S 125 and SUP/S 127. Fox or other protocol connection 130 may be between SUP/S 125 and GC/SUP/E 129. Fox or other protocol connection 130 may be between SUP/S 125 and SUP/S 134. TCP/IP repository synchronization connection 131 may be between VAULT/L 126 and VAULT/L 135. Fox or other protocol connection 130 may be between SUP/S 127 and GC/SUP/E 136. TCP/IP repository synchronization connection 131 may be between VAULT/L 128 and VAULT/L 137. Fox or other protocol connection 130 may be between SUP/S 127 and SUP/S 138. TCP/IP repository synchronization connection 131 may be between VAULT/L 128 and SUP/S 139. Fox or other protocol connection 130 may be between SUP/S 134 and GC/SUP/E 141. TCP/IP repository synchronization connection 131 may be between VAULT/L 135 and VAULT/L 142. Fox or other protocol connection 130 may be between SUP/S 134 and GC/SUP/E 143. TCP/IP repository connection 131 may be between VAULT/L 135 and VAULT/L 144.

FIG. 7 is a diagram of a software update service approach. If there is no internet, a sneaker-net repository synchronization connection 151 (e.g., USP drive, DVD, and so on) may be between SWUS/C 152 and SWUS/F 153. If internet is available, a TCP/IP repository synchronization connection 154 may be between SWUS/C 152 and SWUS/F 153. Fox or other protocol connection 160 may be between SWUS/F 153 and SUP/S 155. TCP/IP repository synchronization connection 161 may be between SWUS/F 153 and SWUS/L 156. Fox or other protocol connection 160 may be between SWUS/F 153 and SUP/S 157. TCP/IP repository synchronization connection 161 may be between SWUS/F 153 and SWUS/L 158. Fox or other protocol connection 160 may be between SUP/S 160 and SUP/S 157. Fox or other protocol connection 160 may be between SWUS/F 153 and GC/SUP/E 159. TCP/IP repository synchronization connection 161 may be between SWUS/F 153 and SWUS/L 163. Fox or other protocol connection 160 may be between SUP/S 155 and GC/SUP/E 159. Fox or other protocol connection 160 may be between SUP/S 155 and SUP/S 164. TCP/IP repository synchronization connection 161 may be between SWUS/L 156 and SWUS/L 165. Fox or other protocol connection 160 may be between SUP/S 157 and GC/SUP/E 166. TCP/IP repository synchronization connection 161 may be between SWUS/L 158 and SWUS/L 167. Fox or other protocol connection 160 may be between SUP/S 157 and SUP/S 168. TCP/IP repository synchronization connection 161 may be between SWUS/L 158 and SWUS/L 169. Fox or other protocol 160 may be between SUP/S 164 and GC/SUP/E 171. TCP/IP repository synchronization connection 161 may be between SWUS/L 165 and SWUS/L 172. Fox or other protocol 160 may be between SUP/S 164 and GC/SUP/E 173. TCP/IP repository synchronization connection 161 may be between SWUS/L 165 and SWUS/L 174.

To recap, a mechanism, for storage and retrieval of information related to controllers, may incorporate a building controller, and a version control system connected to the building controller. The version control system may have the building controller configured to a latest version of changes as incorporated by a current configuration without losing one or more previous configurations. The one or more previous configurations may be recoverable by the version control system.

A previous version building controller configuration may be saved incrementally in that just what has been changed is saved without having to save an entire previous version of the building controller configuration.

A configuration of the building controller may be updated by multiple operators from multiple computers. Overwriting previous changes may be avoided. A previous or latest version of a configuration may be available for the building controller from a repository.

Changes of the configuration may be transmitted to the building controller via an internet-based protocol for direct synchronization when an internet or virtual private network (VPN) access is available.

Changes to the configuration may be sneaker-netted to the building controller using a universal serial bus (USB) drive or computer, for direct synchronization when an internet or virtual private network access is unavailable.

One or more repositories for the version control system may be hosted in a computer or a site server.

One or more repositories for revision control systems may be hosted, in addition to each building controller, in a dedicated server or server cluster or hierarchy for a server based configuration.

The one or more repositories for revision control systems may be hosted, in addition to each building controller, in distributive repositories not permanently connected to building controllers, for a non-server based configuration, and periodically synchronized with one of the distributive repositories residing on a computer temporarily connected to a building controllers' network.

Building controllers on a site of the server may be automatically or manually synchronized to a latest configuration without losing locally generated configuration changes that may have been made by a building operator, maintenance person, or other person.

For a server based job where a repository for each building controller has a connection with a server or with a parent repository in a hierarchical server configuration, automatic synchronization may be applied to a previously configured connection in a repository or repositories in a hierarchy.

The version control system may have a connectivity established to as many remote repositories as desired. Each repository may be independently updated or edited and then merged.

Virtually any repository may be synchronized with any other repository resulting in eventual consistency of all repositories.

A web service that can be deployed on site may also be hosted as a cloud service.

Unwanted or temporary changes to a configuration can be undone by the version control system.

Each repository may be independently updated or edited and merged, with conflict detection and resolution, into a final configuration in the building controller.

Issues in the building controller may be solved by reverting to a previous version of a configuration that is regarded by an operator as a good working version.

An approach, for handling configurations related to controllers, may incorporate providing a building controller having a configuration, connecting a version control system to the building controller, updating the configuration of the building controller to a current version with the version control system, and retrieving a previous version of the configuration for the building controller as needed.

A configuration version manager for controllers may incorporate a controller, a version control system, and a computer connected to the controller and version control system. The version control system may have the controller configured to a latest version of changes as incorporated by a current configuration without losing one or more previous configurations. The one or more previous configurations may be recoverable by the version control system. The one or more previous configurations and the current configuration may be held by one or more repositories. The one or more repositories may be hosted in the computer, a remote computer, or a server.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism for storage and retrieval of information related to controllers, comprising:
    a building controller; and
    a version control system connected to the building controller; and
    wherein:
    the version control system has the building controller configured to a latest version of changes as incorporated by a current configuration without losing one or more previous configurations;
    the one or more previous configurations are recoverable by the version control system;
    a previous or latest version of a configuration is available for the building controller from a repository;
    one or more repositories for the version control system are hosted in a computer or a site server; and
    building controllers on a site of the server can be automatically or manually synchronized to a latest configuration without losing locally generated configuration changes that may have been made by a building operator, maintenance person, or other person.

2. The mechanism of claim 1, wherein a previous version building controller configuration can be saved incrementally in that just what has been changed is saved without having to save an entire previous version of the building controller configuration.

3. The mechanism of claim 1, wherein:
    a configuration of the building controller can be updated by multiple operators from multiple computers; and
    overwriting previous changes is avoided.

4. The mechanism of claim 1, wherein changes of the configuration are transmitted to the building controller via an internet-based protocol for direct synchronization when an internet or virtual private network (VPN) access is available.

5. The mechanism of claim 4, wherein a web service that can be deployed on site can also be hosted as a cloud service.

6. The mechanism of claim 1, wherein changes to the configuration are sneaker-netted to the building controller using a universal serial bus (USB) drive or computer, for direct synchronization when an internet or virtual private network access is unavailable.

7. The mechanism of claim 1, wherein one or more repositories for revision control systems are hosted, in addition to each building controller, in a dedicated server or server cluster or hierarchy for a server based configuration.

8. The mechanism of claim 1, wherein the one or more repositories for revision control systems are hosted, in addition to each building controller, in distributive repositories not permanently connected to building controllers, for a non-server based configuration, and periodically synchronized with one of the distributive repositories residing on a computer temporarily connected to a building controllers' network.

9. The mechanism of claim 1, wherein for a server based job where a repository for each building controller has a connection with a server or with a parent repository in a hierarchical server configuration, automatic synchronization is applied to a previously configured connection in a repository or repositories in a hierarchy.

10. The mechanism of claim 1, wherein the version control system has a connectivity established to a plurality of remote repositories.

11. The mechanism of claim 10, wherein each repository is independently updated or edited and then merged.

12. The mechanism of claim 10, wherein each repository is independently updated or edited and merged, with conflict detection and resolution, into a final configuration in the building controller.

13. The mechanism of claim 1, wherein a repository can be synchronized with another repository resulting in eventual consistency of all repositories.

14. The mechanism of claim 1, wherein unwanted or temporary changes to a configuration can be undone by the version control system.

15. The mechanism of claim 1, wherein issues in the building controller can be solved by reverting to a previous version of a configuration that is regarded by an operator as a working version.

16. A method for handling configurations related to controllers, comprising:
    providing a building controller having a configuration;
    connecting a version control system to the building controller;
    updating the configuration of the building controller to a current version with the version control system; and retrieving a previous version of the configuration from a repository hosted in a computer or site server for the building controller as needed;

wherein the building controller can be automatically or manually synchronized to a latest configuration without losing locally generated configuration changes that may have been made by a building operator, maintenance person, or other person.

17. A configuration version manager for controllers comprising:
- a controller;
- a version control system; and
- a computer connected to the controller and version control system; and wherein:
- the version control system has the controller configured to a latest version of changes as incorporated by a current configuration without losing one or more previous configurations;
- the one or more previous configurations are recoverable by the version control system;
- the one or more previous configurations and the current configuration are held by one or more repositories; and
- the one or more repositories are hosted in the computer, a remote computer, or a servers;
- the controller can be automatically or manually synchronized to the current configuration without losing locally generated configuration changes that may have been made by a building operator, maintenance person, or other person.

18. The configuration version manager of claim 17, wherein a previous version controller configuration can be saved incrementally in that just what has been changed is saved without having to save an entire previous version of the building controller configuration.

19. The configuration version manager of claim 17, wherein:
- a configuration of the controller can be updated by multiple operators from multiple computers; and
- overwriting previous changes is avoided.

* * * * *